United States Patent [19]

Maruyama

[11] Patent Number: 4,547,651
[45] Date of Patent: Oct. 15, 1985

[54] LASER MACHINING APPARATUS

[75] Inventor: Masahiko Maruyama, Seto, Japan

[73] Assignee: Mitsubishi Denki Kabushiki Kaisha, Tokyo, Japan

[21] Appl. No.: 375,093

[22] Filed: May 5, 1982

[30] Foreign Application Priority Data

May 28, 1981 [JP] Japan .................................. 56-81445
Jul. 22, 1981 [JP] Japan .................................. 56-114965
Sep. 18, 1981 [JP] Japan .................................. 56-147152

[51] Int. Cl.$^4$ ............................................. B23K 26/00
[52] U.S. Cl. ........................ 219/121 LG; 219/121 LP; 219/121 LQ; 372/15; 372/92; 372/106
[58] Field of Search ................. 219/121 LG, 121 LN, 219/121 LY, 121 LH, 121 LJ, 121 LP, 121 LQ, 121 LR; 372/27, 98, 105, 106, 15, 92, 85

[56] References Cited

U.S. PATENT DOCUMENTS

| | | | |
|---|---|---|---|
| 3,243,724 | 3/1966 | Vuylsteke | 219/121 LA X |
| 3,407,364 | 10/1968 | Turner | 219/121 LA X |
| 3,410,979 | 11/1968 | Larsson | 219/121 LK X |
| 3,928,814 | 12/1975 | Feichtner | 372/106 X |
| 4,015,221 | 3/1977 | Dalton | 219/121 LA X |
| 4,305,046 | 12/1981 | LeFloch et al. | 372/106 |

OTHER PUBLICATIONS

Graphical Method to Design Multilayer Phase Retarders, Joseph H. Apfel, Applied Optics, vol. 20, No. 6, Mar. 15, 1981, pp. 1024–1029.

*Primary Examiner*—C. L. Albritton
*Attorney, Agent, or Firm*—Wenderoth, Lind & Ponack

[57] ABSTRACT

A laser machining apparatus includes an optical resonator for generating a laser beam and two polarizers disposed in the form of a V within the optical resonator to linearly polarize the laser beam. The linearly polarized laser beam is focussed on a workpiece for cutting purposes while the workpiece is moved in two orthogonal directions. The polarizers are rotated about the optical axis of the laser beam in correspondence with the two dimensional movement of the workpiece to rotate a plane of polarization of the beam to coincide with a cutting direction of the beam. Alternatively, a linearly polarized laser beam from a laser oscillator is circularly polarized with a quarter wave plate and then linearly polarized by a rotatable quarter wave plate to form a cutting beam. The rotatable quarter wave plate is rotated in the same manner as the polarizers to rotate a plane of polarization of the cutting beam.

15 Claims, 5 Drawing Figures

LASER MACHINING APPARATUS

BACKGROUND OF THE INVENTION

This invention relates to improvements in a laser machining apparatus for machining a workpiece with a laser beam.

A conventional laser machining apparatus has comprised an optical resonator including a pair of opposite spherical mirrors and a laser medium disposed between the opposite spherical mirrors to generate a laser machining apparatus beam, a beam duct operatively coupled to one of the spherical mirrors to conduct the laser beam toward a workpiece and a focussing lens for focussing the laser beam on the surface of the workpiece. The focussed laser beam irradiates perpendicularly the surface of the workpiece to cut the latter in a predetermined pattern by moving the workpiece in a pair of orthogonal directions perpendicular to the optical axis of the focussing lens so that the focussed spot of the laser beam depicts the predetermined pattern on the surface of the workpiece.

In conventional laser machining apparatus such as described above, the laser beam is randomly polarized and therefore adversely affects the working capability. This has resulted in the disadvantages that as a machining speed decreases, the workpieces has a rough machined surface due to the rotation of a plane of polarization thereof and a large cut swarf.

Accordingly, it is an object of the present invention to provide a new and improved laser machining apparatus having an improved working capability.

It is another object of the present invention to provide a new and improved laser machining apparatus having a machining speed increased so as to be at least twice that previously obtained.

It is still another object of the present invention to provide a new and improved laser machining apparatus for rendering a cut surface of a workpiece smooth with a small swarf.

SUMMARY OF THE INVENTION

The present invention provides a laser machining apparatus comprising an optical resonator including a pair of partially and totally reflecting mirrors disposed in opposite relationship to each other and a laser medium disposed between the pair of the partially and totally reflecting mirrors to generate a laser beam through the amplification by the laser medium, at least one polarizer disposed between the partially and totally reflecting mirrors to cross the laser beam and to be rotatable about the optical axis of the laser beam, the polarizer linearly polarizing the laser beam, and a driving means for rotating the at least one polarizer about the optical axis of the laser beam so that the linearly polarized laser beam has a plane of polarization coinciding with a direction in which the linearly polarized laser beam machines a workpiece.

In a preferred embodiment of the present invention, a pair of polarizers may be disposed so as to be tilted at predetermined angles to the optical axis of the laser beam to form a V-shaped section.

The present invention also provides a laser machining apparatus comprising a laser oscillator for generating a linearly polarized laser beam, a first quarter wave plate disposed on the optical axis of the linearly polarized laser beam so as to cause the laser beam to be incident thereupon at an azimuth of 45 degrees to the optical axis thereof, a second quarter wave plate disposed to cause the laser beam passed through the first quarter wave plate to be incident upon the second quarter wave plate, the second quarter wave plate being rotatable about the optical axis of the laser beam passed through the first quarter wave plate, and a driving means for rotating the second quarter wave plate about the last-mentioned optical axis so that the laser beam passed through and linearly polarized by the second quarter wave plate has a plane of polarization coinciding with a direction in which the linearly polarized laser beam machines a workpiece.

BRIEF DESCRIPTION OF THE DRAWINGS

The present invention will become more readily apparent from the following detailed description taken in conjunction with the accompanying drawings in which.

Throughout the figures, like reference numerals designate the identical or corresponding components.

DESCRIPTION OF THE PREFERRED EMBODIMENTS

Figure 1:
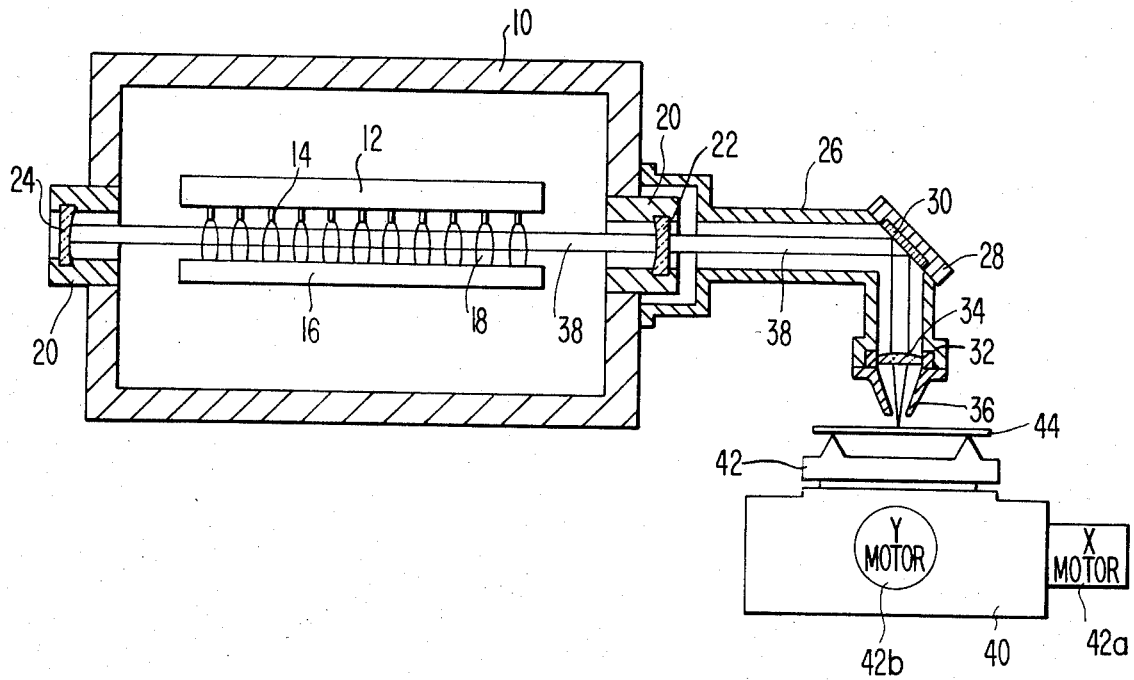
FIG. 1 is a longitudinal sectional view of a conventional laser machining apparatus with parts illustrated in elevation.

Referring now to FIG. 1 of the drawings, there is illustrated a conventional laser machining apparatus. The illustrated arrangement comprises an enclosure 10, a cathode plate 12 disposed within the enclosure 10 so as to be parallel to the longitudinal axis of the latter and including a single array of cathode pins 14 placed at predetermined equal intervals on the surface of the cathode plate 12 facing the longitudinal axis of the enclosure 10 and an anode electrode 16 disposed within the enclosure 10 so as to be substantially parallel to the cathode plate 12 and so as to form spacings of about 12 millimeters between the surface of the same and extremities of the cathode pins 14 with the longitudinal axis of the enclosure 10 substantially halving the spacings. Then, a DC source (not shown) applies a DC voltage of about 2 kilovolts across the cathode pins 14 and the anode electrode 16 through a ballast resistance (not shown) to establish glow discharge 18 thereacross.

The enclosure 10 includes bilateral walls respectively provided with a pair of central opposite holes and a pair of hollow resonator holders 20 hermetically inserted into the respective central holes and closed with reflecting spherical mirrors 22 and 24. The mirror 22 closing the righthand resonator holder 20 as viewed in FIG. 1 has a central aperture so as to form a partially reflecting mirror and the mirror 24 hermetically closes the lefthand resonator holder 20 and forms a totally reflecting mirror. Thus, the two mirrors 22 and 26 are arranged to be directly opposite to each other to put a longitudinal space formed between the cathode pins 16 and the anode plate 16 therebetween. The partially and totally reflecting mirrors 22 and 24 are cooled with cooling water flowing through cooling passageways respectively diposed in the opposite resonator holders 20. The resonator holders 20 are held by respective resonator spacers (not shown) of an alloy having a low coefficient of thermal expansion so that the two reflecting mirrors 22 and 24 have respective optical axes always coinciding with each other. Thus the partially reflecting mirror 22 forms an optical resonator with the totally reflecting mirror 24.

Within the enclosure 10 there are further provided a blower, a heat exchanger, ducts and other elements (not shown) which cooperate with one another to cool a gaseous laser medium formed of a mixture including helium (He), nitrogen ($N_2$), carbon dioxide ($CO_2$) and carbon monoxide (CO) at 200 Torrs and flowing through the space between the cathode pins 14 and the anode electrode 16 and in a direction perpendicular to the plane of FIG. 1 and heated by the glow discharges 18.

The arrangement further comprises a cylindrical beam duct 26 bent into a right angle and having one end portion increased in diameter and hermetically fixed to the outer surface of the righthand wall as viewed in FIG. 1 of the enclosure 10 so as to hermetically enclose the adjacent resonator holder 20. The beam duct 26 is provided at the bent portion with a reflecting mirror 28 held by a mirror holder 30 in such a manner that the reflecting mirror 28 is tilted at an angle of 45 degrees to the longitudinal axis of the duct 26. The beam duct 26 has the other end portion on which a focussing lens 34 is held by a lens holder 32 and which terminates at a nozzle 36.

The reflecting mirror 28 and the focussing lens 34 are cooled with cooling water flowing through cooling passageways (not shown) disposed in the mirror and lens holders 30 and 32.

The reference numeral 38 designates a laser beam generated as will be described later.

In FIG. 1, a work head 40 is shown as being located below the nozzle 36 of the beam duct 29. Then, a carriage 42 is movably disposed on the work head 40 and has a workpiece 44 fixedly secured thereto so as to be perpendicular to the optical axis of the focussing lens 34. The carriage 42 is arranged to be selectively moved in a pair of orthogonal axes, in this case, the X and Y axes of a two dimensional othogonal coordinate system on the surface of the workpiece 44 by means of an X axis motor 42a and a Y axis motor 42b controlled by a numeral control unit (not shown).

When the workpiece 44 is machined with the focussed laser beam irradiating the same, an assisting gas is supplied from a feed port (not shown) disposed on the inside of the nozzle 36 and blown out through the nozzle 36. The assisting gas generally comprises oxygen with the cutting of the workpiece 44 formed of sheet steel, argon with the welding thereof, and compressed air with the workpiece 44 formed of a plastic material.

The operation of the arrangement shown in FIG. 1 will now be described. While the gaseous laser medium is flowing through the space between the cathode pins 14 and the electrode 16 and perpendicularly to the plane of FIG. 1, a DC voltage is applied across the cathode pins 14 and the anode electrode 16 to establish glow discharges 18 thereacross. The flowing laser medium is irradiated with the glow discharges to excite its atoms. Light emitted by those atoms is reflected backwards and forwards along a passageway defined by the reflecting mirrors 22 and 24 which form an optical resonator and stimulates further emission until a laser beam 38 is generated through the amplification by the laser medium.

The laser beam 38 passes through a central hole on the partially reflecting mirror 22 and then the beam duct 26. Within the beam duct 26 the laser beam 38 is reflected from the reflecting mirror 28 toward the focussing lens 34. The focussing lens 34 focusses the laser beam 38 on the surface of the workpiece 44. Thus, the workpiece 44 is irradiated with a focussed spot of the laser beam 38.

Under these circumstances the X and Y axis motors 42a and 42b are respectively operated to move the carriage 42 with the workpiece 44 along the X and Y axes described above as predetermined by the numerical control unit (not shown) until the workpiece 44 is cut in a predetermined pattern as determined by the numerical control unit with thermal energy of the focussed laser beam. During this cutting, the assisting gas is blow out through the nozzle 36 to remove swarfs from the cut workpiece 44.

It is well known that any laser beam includes a pair of components whose electric fields respectively oscillate in parallel with and perpendicular to its incident plane. A workpiece exhibits different absorption coefficients to those components of the laser beam, which, in turn, affects the working capability of the laser beam. Also, it is known that a proportion of one to the other of the components is determined by an extent to which the laser beam is polarized.

In the arrangement of FIG. 1, the laser beam is randomly polarized because the laser beam is not controlled as to its polarization and therefore oscillates in different directions. Thus, the arrangement of FIG. 1 has been disadvantageous in that as a machining speed decreases, the workpiece has a rough machined or cut surface due to a change in plane of polarization of the laser beam and has a larger swarf, resulting in a great reduction in working capability.

The present invention contemplates the elimination of the disadvantages of the prior art practice as described above by the provision of means for rotating a plane of polarization of a linearly polarized laser beam acting as a machining laser beam about the optical axis thereof to coincide with a direction in which the machining by the laser beam is effected.

Figure 2:
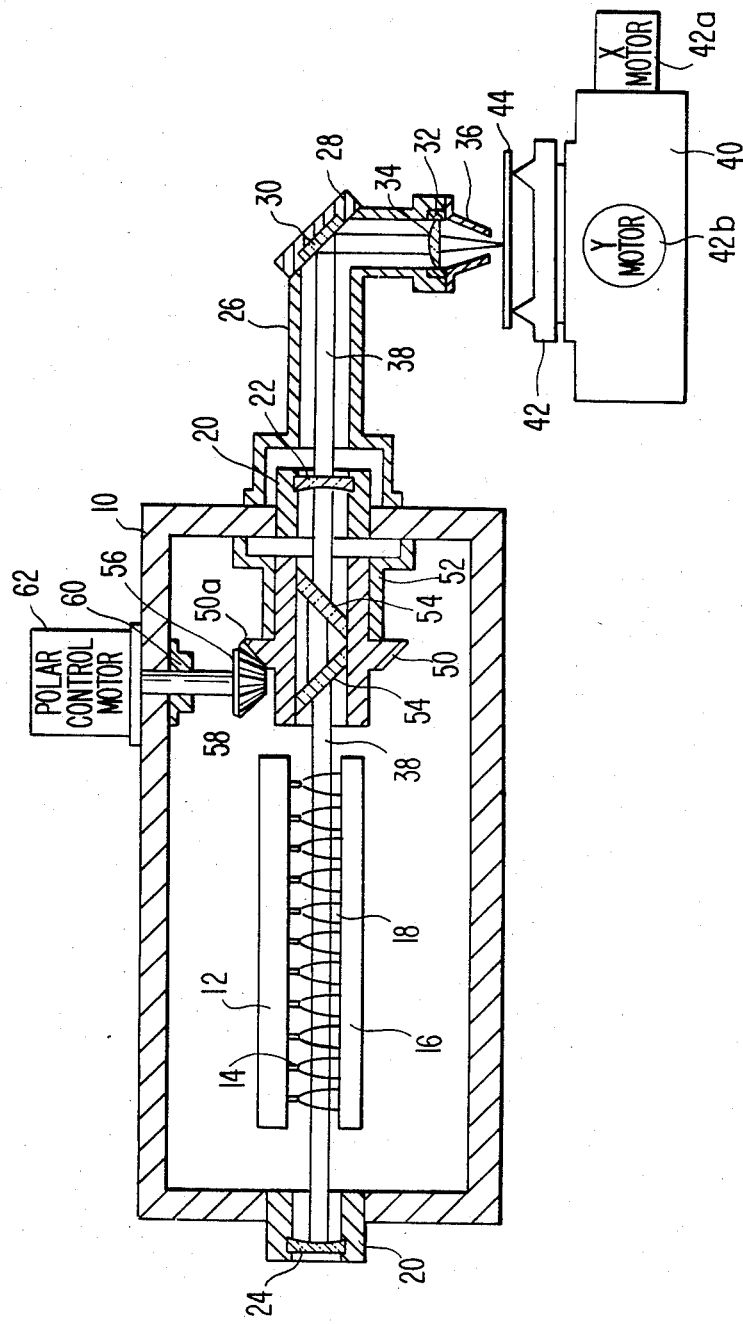
FIG. 2 is a longitudinal sectional view of one embodiment according to the laser machining apparatus of the present invention with parts illustrated in elevation.

Referring now to FIG. 2, there is illustrated one embodiment according to the laser machining apparatus of the present invention. The illustrated arrangement comprises a hollow cylindrical polarizer holder 50 which is rotatably disposed between the anode electrode 16 and the mirror holder 20 for the partially reflecting mirror 22 within the enclosure 10 on the optical axis of the laser beam 38 so as to be coaxial with and axially spaced from that mirror holder 20 by having a bearing 52 fixed to the adjacent wall of the enclosure 10 to rotatably journal the same. A pair of polarizers 54 in the form of zinc selenide (ZnSe) crystal plates are held in opposite relationship to the inner periphery of the holder 50 so as to be tilted at angles of 22.6 degrees to the optical axis of the laser beam 38 respectively and form a V-shaped section along the optical axis of the laser beam 38. Thus, the polarizers 54 are disposed to cross the laser beam 38 and are also arranged to be indirectly cooled with cooling water flowing through a cooling passageway (not shown) disposed within the bearing 52.

The polarizer holder 50 includes a radially outwards directed flange on an intermediate portion thereof to abut against the free end of the bearing 52 and provided on that side thereof remote from the bearing 52 with a bevel gear 50a. Then, the bevel gear 50a meshes with another bevel gear 56 disposed at a lower end of a shaft 58 extended and sealed through the upper wall as viewed in FIG. 2 of the enclosure 10 and pendent substantially perpendicular to the optical axis of the laser beam 38. A sealing member 60 is fixedly secured to the upper wall of the enclosure 10 to hermetically surround the shaft 58 for the purpose of preventing the atmosphere from entering the interior of the enclosure 10 along that portion of the shaft 38 extending through the upper enclosure wall.

The shaft 58 is operatively coupled at the other end to a polarization control motor 62 disposed on the outer surface of the upper housing and controlled by the numerical control unit (not shown) for the X and Y motors 42a and 52b as described above.

Therefore, the polarization control motor 62 is operative to rotate the polarizers 54 about the optical axis of the laser beam 38 through the shaft 58, the bevel gears 56 and 50a and the polarizer holder 50.

In other respects the arrangement is identical to that shown in FIG. 1.

In operation, the laser beam 38 is generated within the enclosure 10 as described above but in the arrangement of FIG. 2, the laser beam 38 passes in a reciprocating relationship through the two polarizers 54 to be linearly polarized in a plane of polarization direction parallel to a plane in which the laser beam 38 is incident upon each of the polarizers 54.

Then, the laser beam 38 thus linearly polarized reaches the workpiece 44 to cut it into a predetermined pattern in the same manner as described above in conjunction with FIG. 1.

In FIG. 2, however, it is noted that, the polarization control motor 62 is operated to rotate both the polarizer holder 50 and therefore the polarizers 54 in such a manner that the focussed spot of the laser beam 38 on the surface of the workpiece 44 has a direction of relative movement thereof or its machining direction coinciding with the plane of polarization thereof or an orientation of an associated electric field. To this end, the plane of polarization of the laser beam 38 on the surface of the workpiece 44 is rotated in correspondence with the rotational movement of the polarizers 54 by utilizing the fact the laser beam 38 has a plane of polarization which is parallel to a plane in which the laser beam is incident upon.

Also, it is noted that the numerical control unit (not shown) controls the polarization control motor 66 so as to be rotated in correspondence and synchronization with the rotational movements of the X and Y axis motors 42a and 42b which are also controlled by the numerical control unit.

In the arrangement of FIG. 2, the plane of polarization of the laser beam 38 always coincides with a tangent at a line or curve along which the workpiece 44 is cut by the laser beam 38. Thus, the absorption of the laser beam 38 by the workpiece 44 increases in a direction in which the machining or cutting of the workpiece 44 proceeds while decreasing in a direction perpendicular to the abovementioned direction, thereby resulting in an increase in a machining or a cutting speed. At the same time, the workpiece has a machined or cut surface free from roughness due to the rotation of the polarized beam. Accordingly, the workpiece 44 can be sharply cut with a small swarf.

This is caused by the fact that the workpiece 44 is melting on that portion thereof having the focussed spot of the laser beam 38 incident thereon and in view of the fact that the resulting melted surface has the laser beam incident thereupon with an angle of incidence approximately equal to a Brewster angle thereof.

Figure 3:
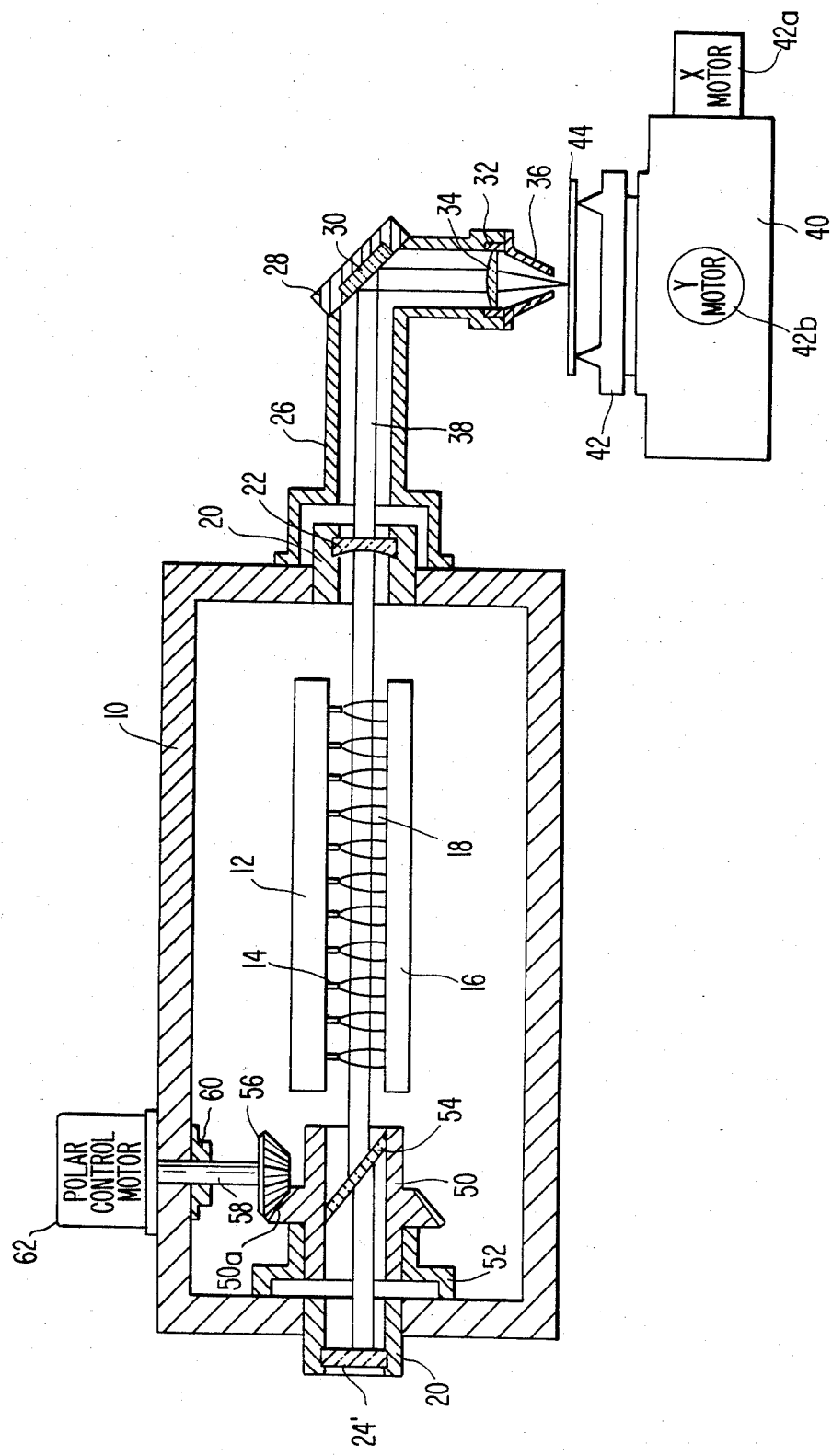
FIG. 3 is a view similar to FIG. 2 but illustrating a modification of the present invention.

While the polarizers 54 and the associated components have been illustrated on that side of the glow discharges 18 nearer to the duct 26 it is to be understood that the same may be disposed on that side of the glow discharges remote from the duct 26 within the enclosure 10 such as shown in FIG. 3 wherein there is illustrated a modification of the present invention.

The arrangement illustrated in FIG. 3 is different from that shown in FIG. 2 only in that in FIG. 3, a signal polarizer 54 and the associated components are disposed on that side of the glow discharges 18 remote from the duct 29 and the totally reflecting mirror is in the form of a plane 24'.

As in the arrangement of FIG. 2, the polarizer 54 is formed of zinc selenide (ZnSe) and tilted at an angle of 22.6 degrees to the optical axis of the laser beam 38 and the polarizer 54 has a lower end as viewed in FIG. 3 near to the anode electrode 16 as the righthand polarizer 54 as viewed in FIG. 2. The polarizer 54 has a Brewster angle of 67.4 degrees.

In operation, the optical axis of the laser beam 38 is moved on the totally reflecting mirror 24' to depict a circle thereon. This is because that, due to the refraction by the polarizer 54 tilted at the angle as described above to the optical axis of the laser beam 38, the rotational axis of the polarizer 54 is eccentric to that portion of the optical axis of the laser beam traveling between the polarizer 54 and the totally reflecting mirror 24'. In other words, the laser beam strikes the mirror surface of the totally reflecting mirror 24' at its position which moves but the mirror 24' is of a plane type so that a portion of the optical axis of the laser beam 38 passing through the glow discharges 18 remains unmoving with the result that the laser beam 38 oscillation is sustained between the totally and partially reflecting mirrors 24' and 22.

Therefore, the laser beam 38 leaving the partially reflecting mirror 22 operates in the same manner as that shown in FIG. 2, resulting in the cutting of the workpiece 44 into a predetermined pattern.

In the arrangement of FIG. 3, the optical axis of the laser beam is changed due to the rotational movement of the single polarizer whereas in the arrangement of FIG. 2, the optical axis of the laser beam is not changed due to the rotational movement of the polarizer because a pair of polarizers are disposed in an opposite relationship to each other.

Figure 4:
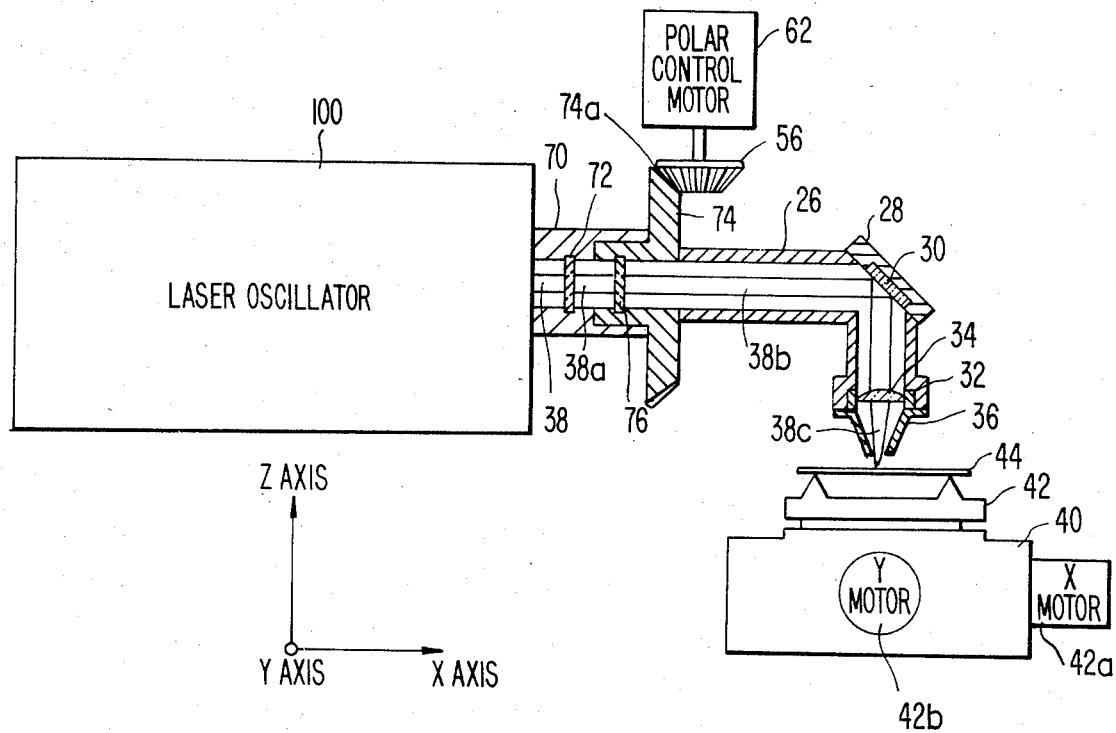
FIG. 4 is a view similar to FIG. 2 but illustrating another modification of the present invention.

Referring now to FIG. 4, there is illustrated another modifications of the present invention. The illustrated arrangement comprises a laser oscillator 100 for generating a linearly polarized laser beam, and a wave plate holder 70 connected to the outlet of the oscillator 100. The laser oscillator 100 may include the components disposed within the enclosure 10 as shown in FIG. 2 or 3 with the omission of a means for controlling the plane of polarization of the laser beam. The wave plate holder 70 has a quarter wave plate 72 which is formed of a double refracting crystal and is disposed at a position where the linearly polarized laser beam 38 from the laser oscillator 100 is incident upon the quarter wave plate 72 perpendicular to the YX plane of that crystal and at angles of 45 degrees with respect to the X and Z axes of the crystal. The double refracting crystal has its crystallographic axes shown below the laser oscillator 100 in FIG. 4. As shown, the crystal has its X axis running along the optical axis of the laser beam 38, its Y axis perpendicular to the plane of FIG. 4 its Z axis extending perpendicular to the X and Y axes in the upward direction as viewed in FIG. 4.

Then, another wave plate holder 74 is rotatably fitted into a circular recess disposed on the free end portion of the wave plate holder 70 and has another quarter wave plate 76 formed similarly of a double refracting crystal and positioned to cross the laser beam from the quarter wave plate 72. The wave plate holder 74 has a radially outwards directed flange abutting against the free end of the holder 70 and provided on that side of the outer periphery remote from the holder 70 with a bevel gear 74a similar to the bevel gear 50a shown in FIG. 2 or 3. The bevel gear 74a meshes with a bevel gear 56 operatively coupled to a polarization control motor 62 such as that shown in FIG. 2 or 3.

In operation, the linearly polarized laser beam 38 is incident upon the quarter wave plate 72 at such an angle that the polarization thereof has an azimuth of 45 degrees to the optical axis thereof. The linearly polarized laser beam 38 passes through the quarter wave plate 72 so as to be transformed to a circularly polarized laser beam 38a by means of the action of that plate which is well known in the art. The circularly polarized laser beam has a direction of oscillation which is rotated.

The circularly polarized laser beam 38a then passes through the quarter wave plate 76 so as to be transformed to a linearly polarized laser beam 38b by means of the action of that plate. The laser beam 38b thus linearly polarized has a plane of polarization forming an angle of 45 degrees to each of the X and Z axes of the quarter wave plate 76.

As described above in conjunction with FIG. 2, the polarization control motor 62 is operated under the control of the numerical control unit (not shown) to rotate the wave plate holder 74 and therefore the quarter wave plate 76 about the optical axis of the laser beam 38a through the bevel gears 56 and 74a until the linearly polarized laser beam 38b has a plane of polarization always lying in a direction in which the cutting of the workpiece 44 proceeds.

In FIG. 4, the reference numeral 38c designates the linearly polarized laser beam after having been focussed by the lens 34.

Figure 5:
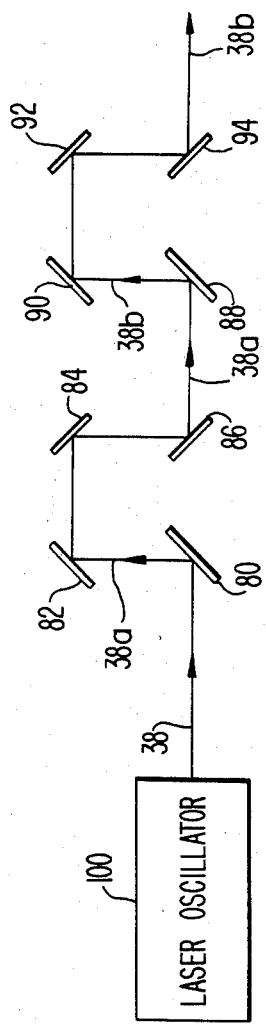
FIG. 5 is a fragmental side elevational view of an optical path used with still another modification of the present invention.

FIG. 5 shows still another modification of the present invention the form of a model. In the illustrated arrangement, a linearly polarized laser beam 38 from a laser oscillator 100 identical to that shown in FIG. 4 is incident upon a reflection type quarter wave plate 80 to be reflected from that plate as a circularly polarized laser beam 38a. The circularly polarized laser beam 38a reflected from the quarter wave plate 80 is successively reflected from three reflecting mirrors 82, 84, 86 arranged to cause the laser beam 38a reflected from the reflecting mirror 86 to travel along an extension of the optical axis of the linearly polarized laser beam 38.

Following this, the circularly polarized laser beam 38a from the reflecting mirror 86 falls on another reflection type quarter wave plate 88 to be reflected as a linearly polarized laser beam 38b therefrom toward a reflecting mirror 90. The reflecting mirror 90 and the succeeding reflecting mirrors 92 and 94 are arranged in the same manner as the reflecting mirrors 82, 84 and 86 so that the linearly polarized laser beam 38b reflected from the mirror 86 travels on an extension of the optical axis of the linearly polarized laser beam 38 from the laser oscillator 100.

The reflection type quarter wave plate 88 and the reflecting mirrors 90, 92 and 94 are arranged to be rotated together about the extension of the optical axis of the linearly polarized laser beam 38 from the laser oscillator 100 by means of any suitable rotating means (not shown) for the same purpose as described above in conjunction with FIG. 2.

From the foregoing it is seen that the present invention provides a laser machining apparatus comprising means for generating a linearly polarized laser, and rotating means for rotating a plane of polarization of the linearly polarized laser beam about the optical axis thereof so that the plane of polarization lies always in a direction in which a workpiece is being cut by the laser beam. The rotating means comprising a polarization control motor for rotating a polarizer or polarizers for generating the linearly polarized laser beam about the optical axis thereof. Also, the present invention provides a laser machining apparatus comprising a laser oscillator for generating a linearly polarized laser beam, a first quarter wave plate for transforming the linearly polarized laser beam to a circularly polarized laser beam, a second quarter wave plate for transforming the circularly polarized laser beam to a linearly polarized laser beam, and means for rotating the second quarter wave plate about optical axis of the first-mentioned linearly polarized laser beam so that the last-mentioned laser beam has a plane of polarization always lying in a direction to machine the workpiece with the latter laser beam. Thus, the present invention is advantageous in that a machining speed increases, the workpiece has a machined surface free from roughness due to the rotation of the polarization and the workpiece is sharply cut with a small swarf.

While the present invention has been illustrated and described in conjunction with a few preferred embodiments thereof, it is to be understood that numerous changes and modifications may be resorted to without departing from the spirit and scope of the present invention. For example, the present invention is equally applicable to the welding of workpieces. In carrying out the present invention, the totally and partially reflecting mirrors and the polarizer or polarizers disposed therebetween may arranged outside the enclosure. That is, the present invention is equally applicable to external optical resonators. Furthermore, the polarizer may be formed of any suitable material which is transparent to laser light, such as sodium chloride (NaCl), potassium chloride (KCl), cadmium telluride (CdTe), or germanium (Ge). In addition, the present invention is equally applicable to three dimensional orthogonal carbon dioxide lasers, coaxial gas lasers, and solid state lasers.

What is claimed is:

1. A laser machining apparatus comprising an optical resonator including a pair of partially and totally reflecting mirrors disposed in opposite relationship to each other and a laser medium disposed between said pair of partially and totally reflecting mirrors to generate a laser beam through the amplification by said laser medium, at least one polarizer disposed between said partially and totally reflecting mirrors to cross said laser beam and to be mechanically rotatable about the optical axis of said laser beam, said polarizer linearly polarizing said laser beam, and mechanical driving means for mechanically rotating said at least one polarizer about the optical axis of said laser beam so that said linearly polarized laser beam has a plane of polarization coinciding with a direction in which said linearly polarized laser beam machines a workpiece.

2. A laser machining apparatus as claimed in claim 1 wherein said polarizer is formed of a material transparent to laser light.

3. A laser machining apparatus as claimed in claim 2 wherein said polarizer is of one material selected from the group consisting of zinc selenide (ZnSe), cadmium telluride (CdTe), sodium chloride (NaCl), potassium chloride (KCl), and germanium (Ge).

4. A laser machining apparatus as claimed in claim 2 wherein said partially and totally reflecting mirrors are affixed to respective resonator holders.

5. A laser machining apparatus as claimed in claim 4 wherein said partially and totally reflecting mirrors are respectively affixed to said resonator holders through resonator spacers formed of an alloy having a low coefficient of thermal expansion so that said mirrors have respective optical axes always coinciding with each other.

6. A laser machining apparatus as claimed in claim 4 wherein said partially and totally reflecting mirrors form an external optical resonator disposed outside of a laser enclosure hermetically filled with said laser medium.

7. A laser machining apparatus comprising an optical resonator including a pair of partially and totally reflecting mirrors disposed in opposite relationship to each other and a laser medium disposed between said pair of partially and totally reflecting mirrors to generate a laser beam through the amplification by said laser medium, at least one polarizer disposed between said partially and totally reflecting mirrors to cross said laser beam and to be rotatable about the optical axis of said laser beam, said polarizer linearly polarizing said laser beam and driving means for rotating said at least one polarizer about the optical axis of said laser beam so that said linearly polarized laser beam has a plane of polarization coinciding with a direction in which said linearly polarized laser beam machines a workpiece;

wherein said polarizer is formed of a material transparent to laser light;
wherein said partially and totally reflecting mirrors are affixed to respective resonator holders;
and wherein said partially and totally reflecting mirrors form an external optical resonator disposed outside of a laser enclosure hermetically filled with said laser medium;
and wherein said polarizers are disposed in pairs and are at predetermined angles with respect to the optical axis of said laser beam and have a V-shaped section along the optical axis of said laser beam.

8. A laser machining apparatus as claimed in claim 7 wherein said driving means includes a polarization control motor.

9. A laser machining apparatus as claimed in claim 7 wherein said polarizers are tilted at angles of 22.6 degrees with respect to the optical axis of said laser beam and formed into a V-shaped section along the optical axis of said laser beam.

10. A laser machining apparatus comprising an optical resonator including a pair of partially and totally reflecting mirrors and a laser medium disposed between said partially and totally reflecting mirrors to generate a laser beam through the amplification by said laser medium, a polarizer which is mechanically rotatably disposed between said laser medium and said totally reflecting mirror at a predetermined angle to the optical axis of said laser beam so as to linearly polarize said laser beam, and a mechanical driving means for mechanically rotating said polarizer about the optical axis of said laser beam so that said linearly polarized laser beam has a plane of polarization coinciding with a direction in which said linearly polarized laser beam machines a workpiece.

11. A laser machining apparatus comprising an optical resonator including a pair of partially and totally reflecting mirrors and a laser medium disposed between said partially and totally reflecting mirrors to generate a laser beam through the amplification by said laser medium a polarizer rotatably disposed between said laser medium and said totally reflecting mirror at a predetermined angle to the optical axis of said laser beam to linearly polarize said laser beam, and driving means for rotating said polarizer about the optical axis of said laser beam so that said linearly polarized laser beam has a plane of polarization coinciding with a direction in which said linearly polarized laser beam machines a workpiece;
wherein said polarizer is of a Brewster angle of 67.4 degrees.

12. A laser machining apparatus as claimed in claim 11 wherein said polarizer is secured to a holder at angle of 22.6 degrees with respect to the optical axis of said laser beam.

13. A laser machining apparatus comprising a laser oscillator for generating a linearly polarized laser beam, a first quarter wave plate disposed on the optical axis of said linearly polarized laser beam so as to cause said laser beam to be incident thereupon at an azimuth of 45 degrees with respect to the optical axis thereof, a second quarter wave plate disposed to cause said laser beam passed through said first quarter wave plate to be incident upon said second quarter wave plate, said second quarter wave plate being rotatable about the optical axis of said laser beam passed through said first quarter wave plate, and driving means for rotating said second quarter wave plate about the last-mentioned optical axis so that said laser beam passed through and linearly polarized by said second quarter wave plate has a plane of polarization coninciding with a direction in which said linearly polarized laser beam machines a workpiece.

14. A laser machining apparatus claimed in claim 13 wherein each of said first and second quarter wave plates is formed of a double refracting crystal.

15. A laser machining apparatus as claimed in claim 14 wherein said second quarter wave plate is affixed to a wave plate holder which is rotated by an electric motor through a bevel gear unit.

* * * * *